(12) United States Patent
Papendieck et al.

(10) Patent No.: US 7,597,298 B2
(45) Date of Patent: Oct. 6, 2009

(54) CARRYING DEVICE

(75) Inventors: Stefan Papendieck, Sereetz (DE);
Lothar Petermann, Bad Schwartau (DE)

(73) Assignee: Dräger Medical AG & Co. KG, Lübeck (DE)

( * ) Notice: Subject to any disclaimer, the term of this patent is extended or adjusted under 35 U.S.C. 154(b) by 222 days.

(21) Appl. No.: 11/843,197

(22) Filed: Aug. 22, 2007

(65) Prior Publication Data
US 2008/0111042 A1    May 15, 2008

(30) Foreign Application Priority Data
Nov. 9, 2006    (DE) .................. 10 2006 052 804

(51) Int. Cl.
*A47F 5/00*    (2006.01)
(52) U.S. Cl. .................................. 248/281.11
(58) Field of Classification Search ........... 248/317, 248/324, 325, 280.11, 282.1, 292.11
See application file for complete search history.

(56) References Cited

U.S. PATENT DOCUMENTS

| | | | | |
|---|---|---|---|---|
| 2,036,097 A | * | 3/1936 | Pieper .................. 378/197 |
| 2,685,352 A | * | 8/1954 | Hukari .................. 52/114 |
| 4,208,028 A | * | 6/1980 | Brown et al. ............ 224/185 |
| 4,844,387 A | * | 7/1989 | Sorgi et al. ............. 108/5 |
| 4,852,842 A | * | 8/1989 | O'Neill ................ 248/284.1 |
| 5,108,063 A | * | 4/1992 | Koerber et al. .......... 248/284.1 |
| 5,340,072 A | * | 8/1994 | Halbirt ................ 248/279.1 |
| 6,012,693 A | * | 1/2000 | Voeller et al. .......... 248/280.11 |
| 6,378,829 B1 | * | 4/2002 | Strater et al. ........... 248/276.1 |
| 6,659,415 B2 | * | 12/2003 | Kummerfeld et al. ...... 248/343 |
| 2004/0188578 A1 | * | 9/2004 | Turner ................ 248/281.11 |
| 2007/0228230 A1 | * | 10/2007 | Papendieck et al. ........ 248/126 |
| 2008/0111039 A1 | * | 5/2008 | Papendieck et al. ...... 248/281.11 |

FOREIGN PATENT DOCUMENTS

| | | |
|---|---|---|
| DE | 41 20 260 C1 | 1/1993 |
| DE | 102004026117 | 7/2005 |
| GB | 2178508 A * | 2/1987 |

\* cited by examiner

*Primary Examiner*—J. Allen Shriver, II
*Assistant Examiner*—Erin Smith
(74) *Attorney, Agent, or Firm*—McGlew and Tuttle, P.C.

(57) ABSTRACT

A carrying device for medical devices provides simple adjustment operation. The carrying device has a height-adjustable bracket (1) designed in the form of a parallelogram cranking mechanism with a self-locking pneumatic spring (13). A supply unit (21) for medical devices is arranged at one end of the bracket (1). A handle (22) with an electric release element (23) is arranged at the supply unit (21). A valve, which releases the blocking function, is opened within the pneumatic spring (13) during the actuation of the release element (23).

3 Claims, 2 Drawing Sheets

CARRYING DEVICE

CROSS REFERENCE TO RELATED APPLICATIONS

This application claims the benefit of priority under 35 U.S.C. § 119 of German Patent Application DE 10 2006 052 804.2 filed Nov. 9, 2006, the entire contents of which are incorporated herein by reference.

FIELD OF THE INVENTION

The present invention pertains to a carrying device with a height-adjustable bracket, which has bracket legs arranged between two end-side head pieces in the form of a parallelogram cranking mechanism and with a self-locking pneumatic spring between one of the head pieces and one of the bracket legs and with a ceiling bracket at a first head piece and a supply unit for medical devices at a second head piece.

BACKGROUND OF THE INVENTION

A carrying device of the type is known from U.S. Pat. No. 4,844,387. Two bracket legs, which are connected to the head pieces in an articulated manner, are arranged between two end-side head pieces in the form of a parallelogram cranking mechanism. To compensate the weight of an object being carried, an opposing force means in the form of a pneumatic spring is provided, which ensures that the height of the object being carried can be set in a predetermined position with the parallelogram cranking mechanism. The pneumatic spring is self-locking and has a valve, by which the pneumatic spring is released. The valve can be actuated via a pushbutton arranged laterally on the bracket.

One of the head pieces is attached to a table or desk with a cranking mechanism, while a device mount for a monitor is arranged at the other head piece. The monitor can be set to the desired working height with a handle on the front side of the device mount. By actuating the pushbutton on the bracket, the self-locking of the pneumatic spring is abolished for this. Such brackets are also used in medical treatment rooms to mount monitoring devices. The monitoring device can be positioned at the eye level of the user in a simple manner by means of the freely swiveling parallelogram cranking mechanism.

The drawback of the prior-art carrying device is that two hands are needed for the adjustment, one of which swivels the device mount while the other actuates the pushbutton.

A height-adjustable bracket with a parallelogram cranking mechanism between two head pieces and with a self-locking pneumatic spring, in which [spring] the self-locking can be abolished with a hydraulic system, is known from DE 10 2004 026 117 B3. The hydraulic system has a hydraulic release element at the pneumatic spring, a release button and a hydraulic line between the hydraulic release element and the release button.

The release button is arranged at a head piece of the bracket, and one-hand operation is not solved satisfactorily in combination with an additional supply unit for medical devices. The prior-art hydraulic system is suitable for pneumatic springs of a small size only because of the forces to be transmitted.

SUMMARY OF THE INVENTION

The basic object of the present invention is to improve a carrying device of the type mentioned in terms of simple operation.

According to the invention, a carrying device is provided with a height-adjustable bracket, which has bracket legs arranged between two end-side head pieces in the form of a parallelogram cranking mechanism. A self-locking pneumatic spring is connected between one of the head pieces and one of the bracket legs. The self-locking pneumatic spring has a valve for abolishing the blocking function. A ceiling bracket is provided at a first head piece and a supply unit for medical devices is provided at a second head piece. A handle at the supply unit is provided for swiveling the bracket. An electric release element is connected to the handle in one assembly unit. A transmission means for actuating the valve is operatively connected between the electric release element and the valve.

The transmission means may comprise a pneumatic piston releasing the valve, a solenoid valve, which is connected to a compressed gas source and can be opened by the release element, and a compressed gas line between the pneumatic piston and the solenoid valve.

The transmission means may comprise a lifting magnet actuating the valve and a power source for actuating the lifting magnet. In this case the release element is designed to switch the power source in functional connection with the lifting magnet.

A pushbutton may be provided as the release element at the handle.

The advantage of the present invention can be seen in the fact that the release element for the pneumatic spring, which release element closes an electric circuit, is arranged directly at a handle, which is used to swivel a supply unit for medical devices, which is connected to the bracket. The handle is located at the supply unit at a grip level suitable for the user.

Compressed gas connections and electric terminals for supplying medical respirators and monitoring devices with media are located at the supply unit. The release element is connected to a circuit, which actuates the valve at the pneumatic spring for abolishing the blocking function, in the form of an electric switch or pushbutton. The release element is arranged at the handle ergonomically in such a way that it can be actuated in the form of a one-hand operation with the thumb of one hand, while the other fingers grasp around the handle. The electric actuation of the valve has the advantage that no special force has to be applied to the release element to abolish the self-locking of the pneumatic spring.

A combined pneumatic-electric drive is suitable for actuating the valve, or a purely electrical drive is used. In the case of the combined pneumatic-electric drive, the valve is actuated by a pneumatic piston, and compressed gas is admitted to the pneumatic piston via a solenoid valve. The solenoid valve is electrically connected to the release element. In case of a purely electric drive, the valve is actuated by a lifting magnet.

An exemplary embodiment of the present invention is shown in the drawings and will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
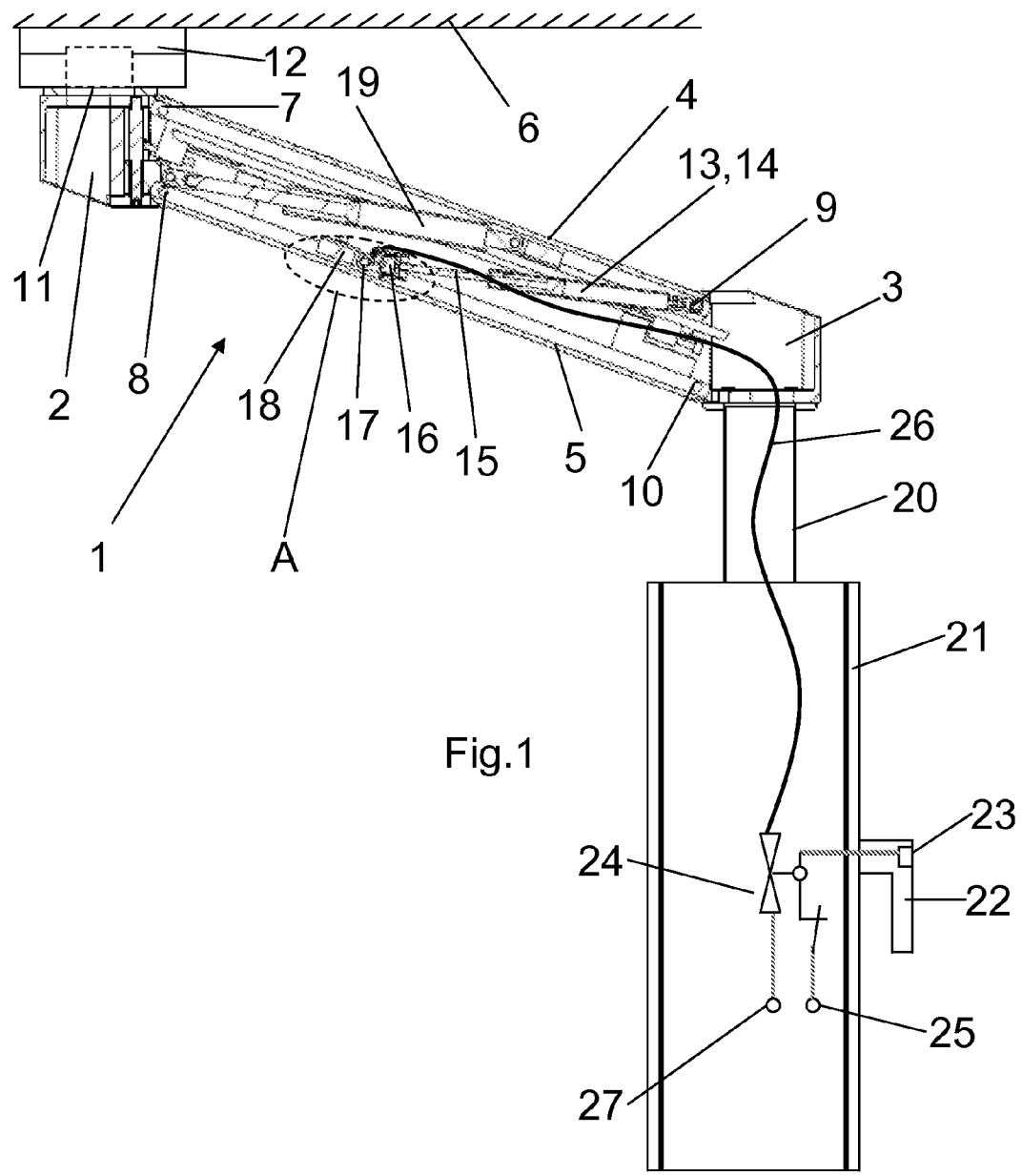
FIG. 1 is a longitudinal sectional view of a carrying device.

Referring to the drawings in particular, FIG. 1 schematically shows a longitudinal section of a bracket 1, which comprises a first head piece 2, a second head piece 3, a first bracket leg 4, a second bracket leg 5 and a pneumatic spring 13. The bracket legs 4, 5 are connected in the form of a parallelogram cranking mechanism to the head pieces 2, 3 via pin joints 7, 8, 9, 10. The first head piece 2 is fastened to the ceiling 6 of a treatment room via a hinge 11 with a ceiling flange 12. A self-locking pneumatic spring 13, whose piston sleeve 14 is connected to the pin joint 9, is located between the upper pin joint 9 at the second head piece 3 and the second bracket leg 5. The pneumatic spring 13 may be of the type disclosed in GB 2, 178, 508 A (which is incorporated by reference in its entirety) wherein the lifter 28 includes a valve 29 with a sealing cone and the spring arrangement presses the sealing cone on a valve seat of the valve 29. As the pneumatic spring 6 is a self locking pneumatic spring, an additional pull back spring between handle 20 and gripping element 22 is not required. A lifting rod 15 of the pneumatic spring 13 is fastened to the second bracket leg 5 via a pneumatic cylinder 16, a hinge 17 and a bearing block 18. Another pneumatic spring 19 is arranged as an opposing force means between the first bracket leg 4 and the lower pin joint 8 at the first head piece 2. A downwardly extending tube 20 with a supply unit 21 for medical devices, not shown in more detail, is located at the second head piece 3. The media connections at the supply unit 21 for compressed gas, electric energy and data transmission are not shown in FIG. 1 for the sake of greater clarity.

A handle 22 with a pushbutton 23 for swiveling the bracket 1 is located at the supply unit 21. The pushbutton 23 is connected to a solenoid valve 24 and to a power supply terminal 25. The pneumatic cylinder 16 is connected to a compressed gas source 27 via a compressed gas line 26 and the solenoid valve 24.

Figure 2:
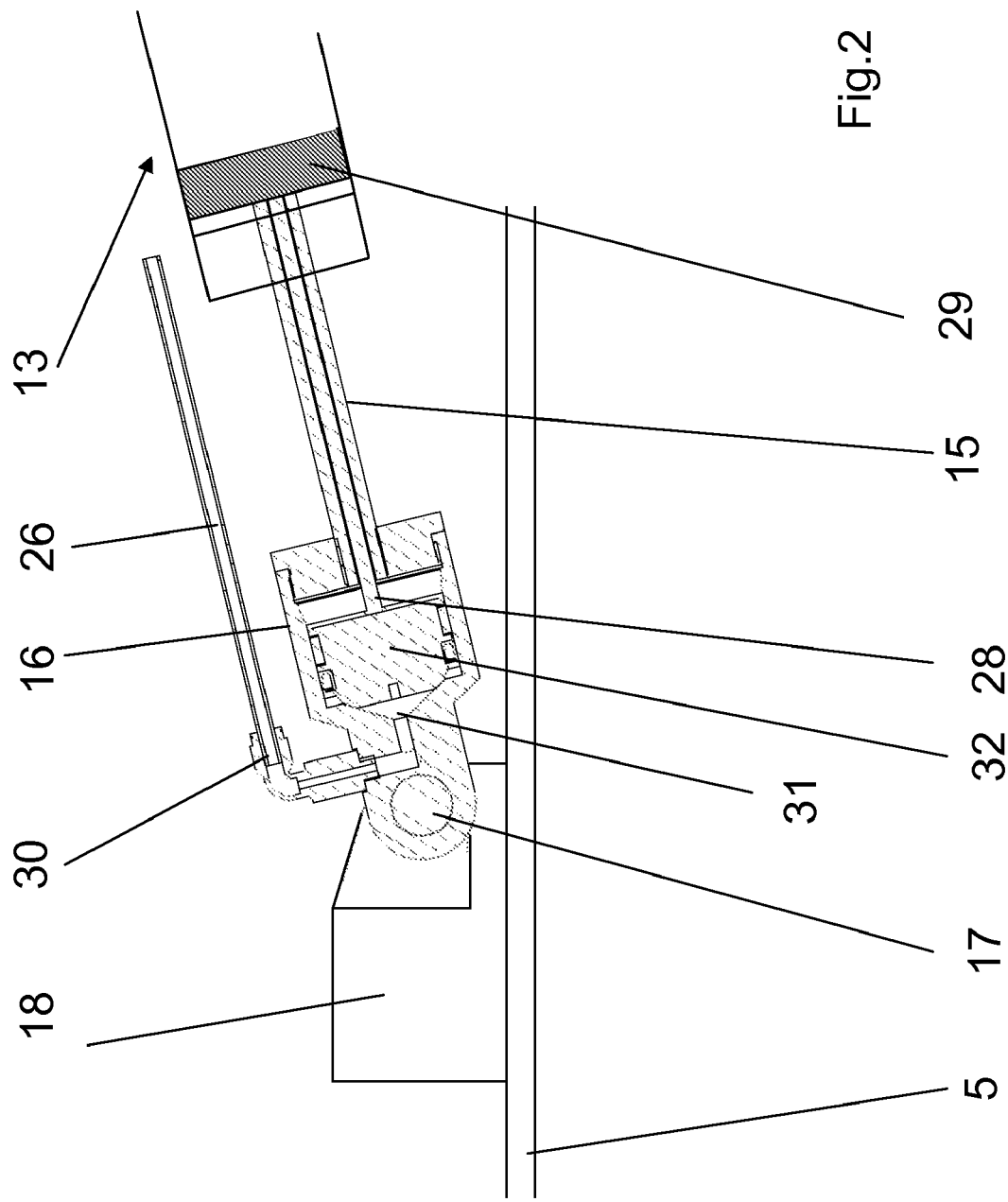
FIG. 2 is a detailed view A from FIG. 1 showing aspects of the carrying device according to FIG. 1.

FIG. 2 schematically illustrates detail A according to FIG. 1. Identical components are designated by the same reference numbers as in FIG. 1. A lifter 28, which actuates a valve 29 within the pneumatic spring 13, and with which the self-locking of the pneumatic spring 13 can be abolished, is accommodated in the lifting rod 15 of the pneumatic spring 13 in such a way that it can perform strokes. The compressed gas line 26 arriving from the solenoid valve 24 is connected to a pressure chamber 31 of the pneumatic cylinder 16 via a compressed gas connection 30. The pressure space 31 is limited by a piston 32 in the pneumatic cylinder 16, which actuates the lifter 28.

The carrying device according to the present invention operates as follows.

The user grasps the handle 22, in a user hand engagement area, with the user's hand and actuates the pushbutton 23, which is disposed adjacent to the user hand engagement area, preferably connected to the handle 22 in one assembly unit. An electric circuit is closed by the pushbutton 23 and the solenoid valve 24 opens, as a result of which compressed gas is admitted into the compressed gas line 26 via the compressed gas source 27. The piston 32 is now displaced to the right and actuates the lifter 28, as a result of which the valve 29 of the pneumatic spring 13 opens and the self-locking of the pneumatic spring 13 is abolished. The bracket 1 can now be swiveled upward or downward. When the pushbutton 23 is released, the solenoid valve closes, the compressed gas line 26 is vented and the piston 23 is pushed back into the starting position by the lifter 28. The valve 29 closes and the pneumatic spring is again locked.

While specific embodiments of the invention have been shown and described in detail to illustrate the application of the principles of the invention, it will be understood that the invention may be embodied otherwise without departing from such principles.

What is claimed is:

1. A carrying device comprising:

bracket legs arranged between a first end-side head piece and a second end-side head piece forming a parallelogram height-adjustable bracket;

a self-locking pneumatic spring between one of said first end-side head piece and said second end-side head piece and one of said bracket legs, said self-locking pneumatic spring having a valve for abolishing a blocking function of said self-locking pneumatic spring;

a ceiling bracket connected at said first head piece;

a supply unit for medical devices connected at said second head piece;

a handle at the supply unit for swiveling the bracket;

an electric release element connected to the handle in one assembly unit; and a transmission means for actuating said valve, said transmission means being operatively connected between said electric release element and said valve, said transmission means comprising a pneumatic piston releasing said valve, a solenoid valve connected to a compressed gas source, said solenoid valve being opened by said release element and a compressed gas line between said pneumatic piston and said solenoid valve.

2. A carrying device in accordance with claim 1, wherein said release element comprises a pushbutton provided at said handle.

3. A carrying device comprising:

a first bracket leg, a second bracket leg;

a first end-side head piece;

a second end-side head piece, said first bracket leg, said second bracket leg, said first end-side head piece and said second end-side head piece cooperating to form a parallelogram height-adjustable bracket;

a self-locking pneumatic spring between one of said first end-side head piece and said second end-side head piece and one of said bracket legs, said self-locking pneumatic spring having a valve switchable between a locked pneumatic spring state and an unlocked pneumatic spring state;

a ceiling bracket connected at said first head piece;

a medical devices supply unit at said second head piece;

a handle at the supply unit for swiveling the bracket, said handle having a user hand engagement area;

an electric release element positioned adjacent to said user hand engagement area for actuation by the user; and a transmission means for actuating said valve, said transmission means being operatively connected between said electric release element and said valve, wherein said transmission means comprises: a pneumatic piston releasing said valve; a solenoid valve connected to a compressed gas source, said solenoid valve being opened by said release element; and a compressed gas line between said pneumatic piston and said solenoid valve and wherein said release element comprises a pushbutton provided at said handle.

* * * * *